No. 630,068. Patented Aug. 1, 1899.
S. NEUMANN.
BICYCLE SUPPORT.
(Application filed Feb. 3, 1898.)
(No Model.)
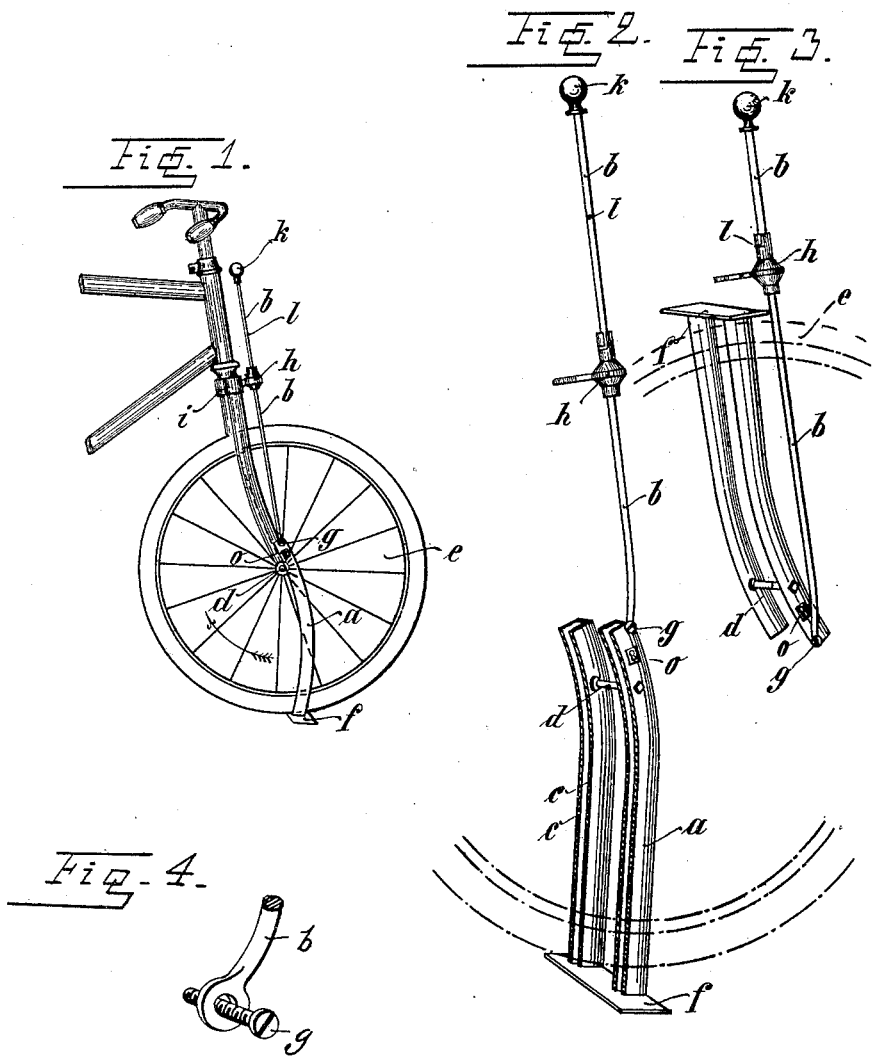

UNITED STATES PATENT OFFICE.

SAMUEL NEUMANN, OF STUTTGART, GERMANY.

BICYCLE-SUPPORT.

SPECIFICATION forming part of Letters Patent No. 630,068, dated August 1, 1899.

Application filed February 3, 1898. Serial No. 668,948. (No model.)

*To all whom it may concern:*

Be it known that I, SAMUEL NEUMANN, cafétier, of 6 Seidenstrasse, Stuttgart, in the Kingdom of Würtemberg, Germany, have invented an Improved Bicycle-Support, of which the following is a specification, reference being had therein to the accompanying drawings.

This invention relates to an apparatus for supporting a bicycle when not in motion. The apparatus is also capable of being used as a permanent bicycle-stand; and in order that my invention may be properly understood I have hereunto appended an explanatory sheet of drawings, whereon—

Figure 1 is a view showing the apparatus resting upon the ground. Fig. 2 is a view of the apparatus in perspective to an enlarged scale. Fig. 3 is a view of the apparatus as it appears when folded up. Fig. 4 is a detail showing the manner of mounting the lower end of the operating-rod.

As is apparent from Figs. 2 and 3, the novelty of the invention consists in the combination of a fork-shaped frame $a$ and a forcing-rod $b$. The frame is formed of two standards $c$, of channel section, which run in a parallel direction to one another and are slightly bent. The frame is so fitted to the front wheel $e$ as to be capable of rotating upon the lengthened axle $d$. The two standards are joined at their lower ends by a plate $f$, upon which it rests when the bicycle is stationary. The upper end of one of the standards is connected to the forcing-rod $b$ by means of the screw $g$ in such a manner that a turning movement of the rod $b$ is permitted. The upper end of the forcing-rod $b$ passes through a bayonet-socket $h$, as shown in Figs. 1, 2, and 3, which is attached by a secure fixture to the fork $i$ of the frame of the machine. The rod $b$ is capable of a turning movement within the socket. A pin $l$ is fixed to the upper part of the rod $b$ and is capable of being locked into the bayonet-slot of the socket $h$, so as to hold the apparatus firmly in position when the same has been folded up.

To facilitate manipulation, the rod $b$ is provided with a knob $k$ at its upper end.

The *modus operandi* is as follows: When the rider has dismounted, he disengages the pin $l$ and then pulls upon the handle $k$, whereupon the frame $a$ falls down. The front wheel $e$ is now slightly raised, so as to allow the plate $f$ to fall automatically underneath the wheel. During this movement of the plate $f$ a lock $o$, below the screw-bolt $g$, as shown at Fig. 2, locks with a snap and secures together the fork of the front wheel and the frame $a$. When the rider wishes to use his machine again, he opens the lock $o$ by means of a special key and then depresses the rod $b$, so as to turn up the device $a$ to the position shown at Fig. 3. Thereafter he gives the rod $b$ a twist, so as to lock the pin $l$ in the bayonet-slot of the socket $h$.

One advantage to be derived from the use of the apparatus as hereinbefore described over the apparatuses as hitherto used consists in the fact that it not only forms a bicycle-stand, but that it places increased difficulties in the way of a person stealing the machine.

The apparatus can be applied to both wheels, if so desired.

What I claim, and desire to secure by Letters Patent of the United States, is—

1. A bicycle-support consisting of two parallel arms adapted to be pivotally mounted on the axle of a bicycle, and to swing on their pivots into a substantially vertical position to support the bicycle and into a reverse position when not in use, and a plate connecting the outer ends of said arms, a single rod having its lower end connected directly to the upper end of one of said arms beyond the pivot of the latter by a connection permitting a turning movement of the said rod, and its other end passed through a fixed guide, substantially as shown and described.

2. A bicycle-support in combination with a bicycle, the support comprising two parallel arms pivotally mounted on the extended ends of the axle of the front wheel of said bicycle, the major portion of said arms being extended beyond the pivot thereof and connected by a flat plate, and the minor portion of said arms disconnected, a rod having its lower end connected directly to the minor portion of one of said arms by a screw passing through an enlarged hole in the lower end of the rod, a pin projecting from the rod, and a guide through which said rod reciprocates to throw the arms into a vertical position for supporting the bicycle when at rest and into the reverse vertical position when not in use, and the said guide provided with a bayonet-slot to engage said pin, all substantially as and for the purpose specified.

In witness whereof I have hereunto set my hand in presence of two witnesses.

SAMUEL NEUMANN.

Witnesses:
WM. HAHNS,
H. WAGNER.